(12) United States Patent
Hasan et al.

(10) Patent No.: US 6,707,813 B1
(45) Date of Patent: Mar. 16, 2004

(54) METHOD OF CALL CONTROL TO MINIMIZE DELAYS IN LAUNCHING MULTIMEDIA OR VOICE CALLS IN A PACKET-SWITCHED RADIO TELECOMMUNICATIONS NETWORK

(75) Inventors: Suhail Hasan, Montreal (CA); Shohreh Savoli, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/510,964

(22) Filed: Feb. 21, 2000

(51) Int. Cl.[7] .............................................. H04L 12/66
(52) U.S. Cl. ........................ 370/356; 370/328; 370/401
(58) Field of Search ................................. 370/352, 353, 370/354, 355, 356, 357, 328, 329, 401, 402, 465

(56) References Cited

U.S. PATENT DOCUMENTS

| | | | | |
|---|---|---|---|---|
| H1641 H | * | 4/1997 | Sharman ...................... 370/338 |
| 5,729,544 A | * | 3/1998 | Lev et al. .................... 370/352 |
| 5,883,891 A | | 3/1999 | Williams et al. ............. 370/356 |
| 6,064,653 A | * | 5/2000 | Farris .......................... 370/237 |
| 6,137,792 A | * | 10/2000 | Jonas et al. .................. 370/354 |
| 6,154,445 A | | 11/2000 | Farris et al. ................. 370/237 |
| 6,452,920 B1 | * | 9/2002 | Comstock .................... 370/349 |
| 6,466,544 B1 | * | 10/2002 | Sen et al. .................... 370/231 |
| 6,507,577 B1 | * | 1/2003 | Mauger et al. .............. 370/356 |
| 6,522,627 B1 | * | 2/2003 | Mauger ....................... 370/230 |
| 6,545,992 B2 | * | 4/2003 | Naqvi et al. ................. 370/335 |
| 6,546,247 B1 | * | 4/2003 | Foti et al. .................... 455/433 |
| 6,584,098 B1 | * | 6/2003 | Dutnall ........................ 370/354 |

FOREIGN PATENT DOCUMENTS

| | | |
|---|---|---|
| EP | 1054569 A1 | 5/1999 |
| GB | 2331197 A | 11/1997 |
| WO | WO98/48542 | 4/1998 |

* cited by examiner

Primary Examiner—Min Jung
(74) Attorney, Agent, or Firm—Smith & Danamraj, PC

(57) ABSTRACT

A method of call control in a packet-switched radio telecommunication network that minimizes delays in launching a voice call from a first Internet Protocol (IP)-based mobile station (MS) to a second IP-based MS. The method includes the steps of preventing voice traffic from being routed to an Internet Service Provider (ISP), and setting up an optimized path for voice traffic from the first MS to the second MS. The optimized path may be set up by creating a shortest route tunnel between a first serving GPRS service node (SGSN1) serving the first MS and a second SGSN (SGSN2) serving the second MS. Alternatively, the tunnel may be established between the base station controllers (BSCs) of each MS's serving radio base station.

10 Claims, 3 Drawing Sheets

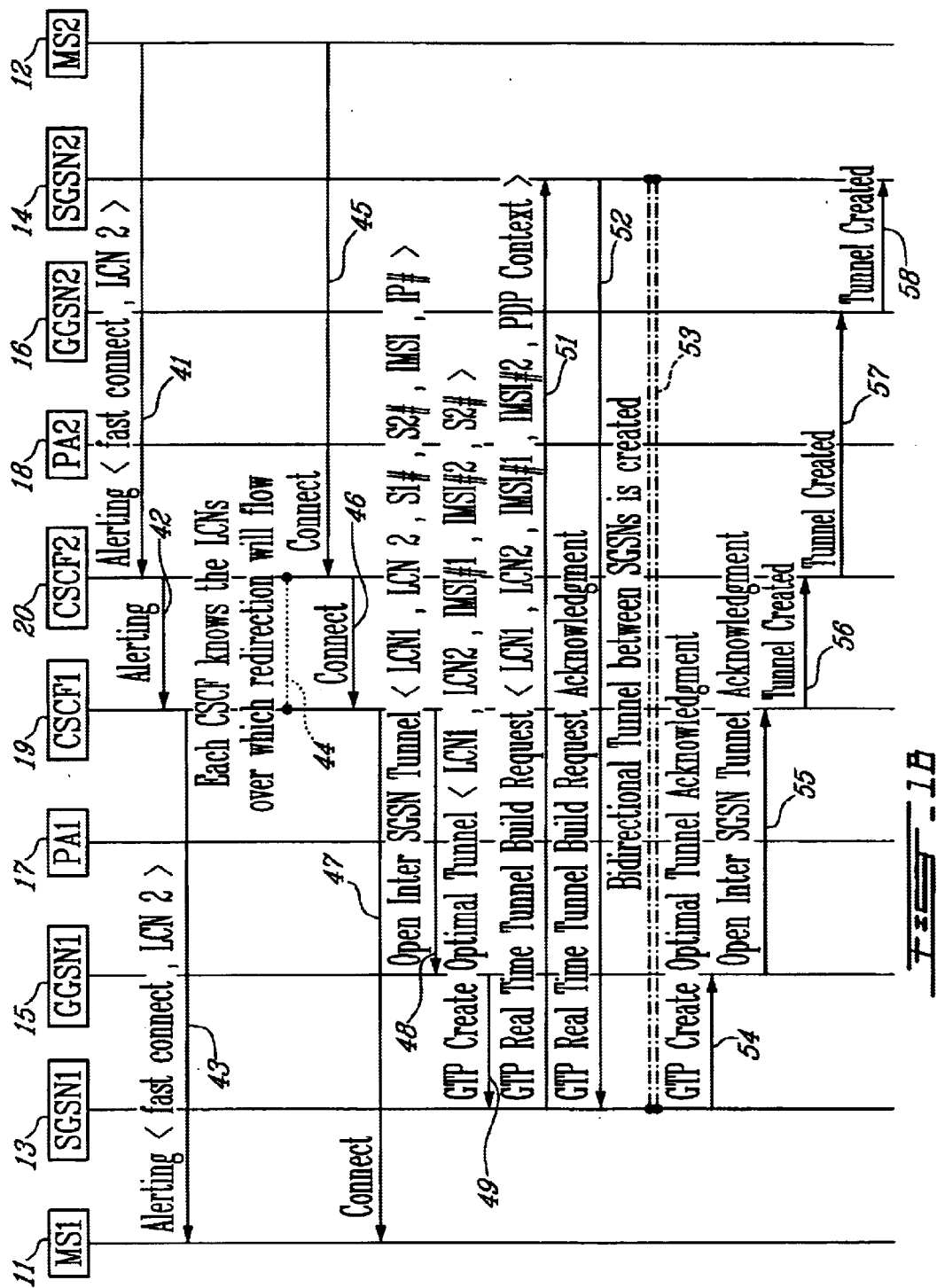

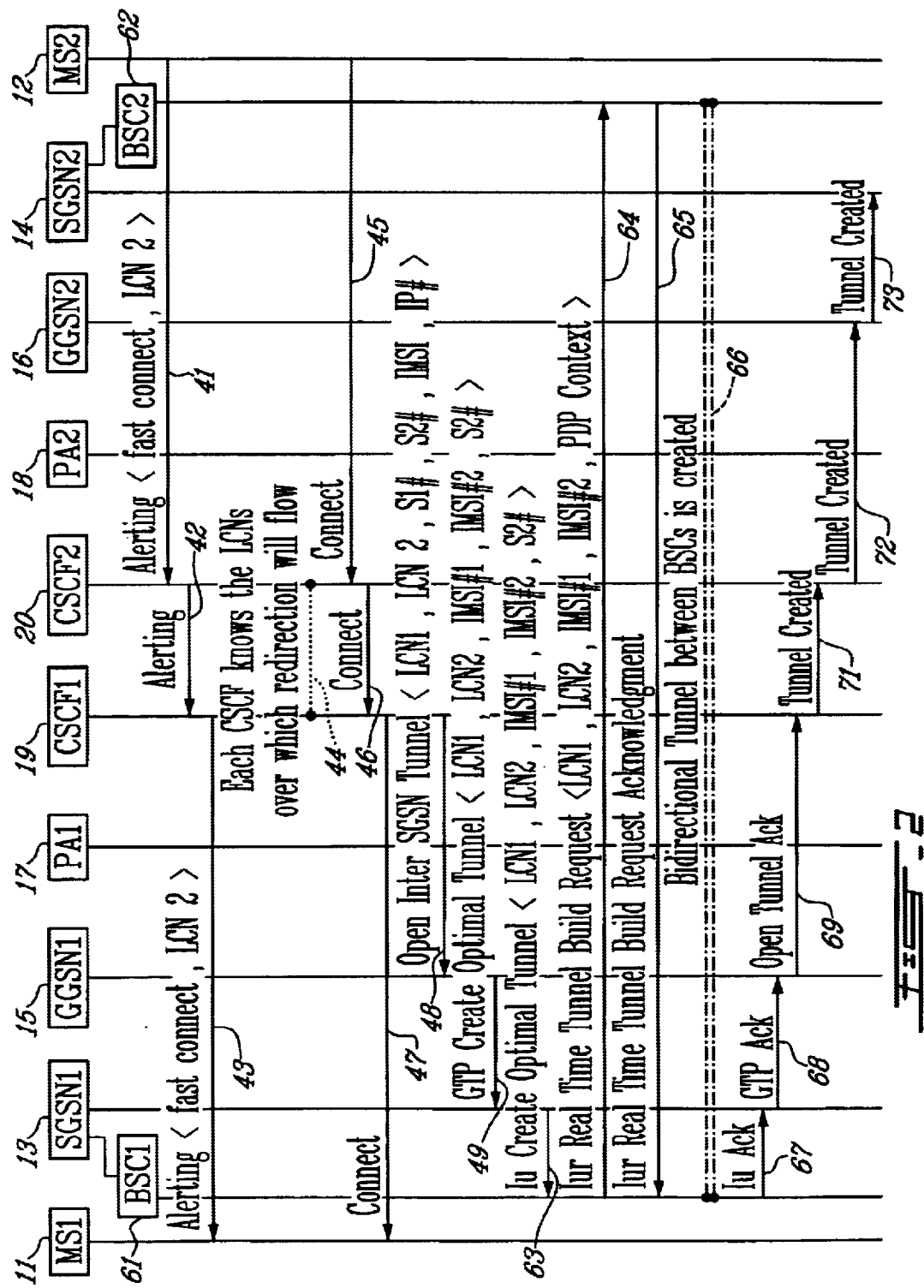

METHOD OF CALL CONTROL TO MINIMIZE DELAYS IN LAUNCHING MULTIMEDIA OR VOICE CALLS IN A PACKET-SWITCHED RADIO TELECOMMUNICATIONS NETWORK

BACKGROUND OF THE INVENTION

1. Technical Field of the Invention

This invention relates to radio telecommunication systems and, more particularly, to a method of call control to minimize delays in launching multimedia or voice calls in a packet-switched radio telecommunications network.

2. Description of Related Art

In the methodology currently utilized for a call case involving two third generation IP-based mobile stations (MS1 and MS2), the mobile stations launch multicast discovery messages for either a Class-D H.323 gatekeeper at IP address 224.0.1.41 or a Session Initiation Protocol (SIP) proxy server at address 224.0.1.75. "Third generation" is the terminology used for launching multimedia or voice calls over packet-switched mobile access systems such as the General Packet Radio Service (GPRS) and the Universal Mobile Telecommunication System (UMTS), the wideband Code Division Multiple Access (CDMA) technique utilized on GPRS. In theory, any gatekeeper/server that joins the above mentioned Class-D multicast group is free to reply to the discovery message. Once an MS-to-MS third generation call is launched, the path traversed by the media stream can be very random, and could involve multiple Gateway GPRS Service Nodes (GGSNs) and Internet Service Providers (ISPs)/Public Internet Protocol (IP) networks. The delay induced in the core network and the ISPs could vary from 10 ms to hundreds of milliseconds depending on the actual path taken by the Packet Data Unit (PDU).

Recommendations from the International Telecommunications Union-Telecommunications Standardization Sector (ITU-T), in particular ITU-T Recommendations G.114 and G.131, specify the effect of various delay ranges on the quality of a voice call. These recommendations state that any call taking over 400 ms for end-to-end delivery of the voice payload is considered unacceptable for normal interactive communication, and half-duplex procedures are then required. Given the sizable delay, already accumulated in packetizing and sending the PDU over the air interface, it is imperative that the core network create the shortest additional delay possible in order to minimize the overall delay in end-to-end delivery of the voice payload.

However, under existing standards, a calling MS's GGSN will route a voice or multimedia call to the MS's ISP where the MS-to-MS call is diverted into the public Internet. This leads to inordinate delays and the actual expiration of call control timers. Therefore, it would be advantageous to have a method of call control that minimizes delays in launching multimedia or voice calls over packet-switched mobile access systems. The present invention provides such a method.

SUMMARY OF THE INVENTION

The present invention is a method of call control in a packet-switched radio telecommunication network that minimizes delays in launching a voice call from a first Internet Protocol (IP)-based mobile station (MS) to a second IP-based MS. The method includes the steps of preventing voice traffic from being routed to an Internet Service Provider (ISP), and setting up an optimized path for voice traffic from the first MS to the second MS. The optimized path may be set up by creating a shortest route tunnel between a first service node serving the first MS and a second service node serving the second MS. The tunnel may be established between a first Serving GPRS service node (SGSN1) serving the first MS and a second SGSN (SGSN2) serving the second MS. Alternatively, the tunnel may be established between the base station controllers (BSCs) of each MS's serving radio base station in the case of UMTS or CDMA2000 where packet-based inter-BSC links have been defined.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIGS. 1A–1B are a message flow diagram illustrating the flow of messages between the nodes of a packet-switched mobile access system when establishing an optimized tunnel in accordance with a first embodiment of the method of the present invention; and FIG. 2 is a message flow diagram illustrating the flow of messages between the nodes of a packet-switched mobile access system when establishing an optimized tunnel in accordance with a second embodiment of the method of the present invention.

DETAILED DESCRIPTION OF EMBODIMENTS

Figure 1A:
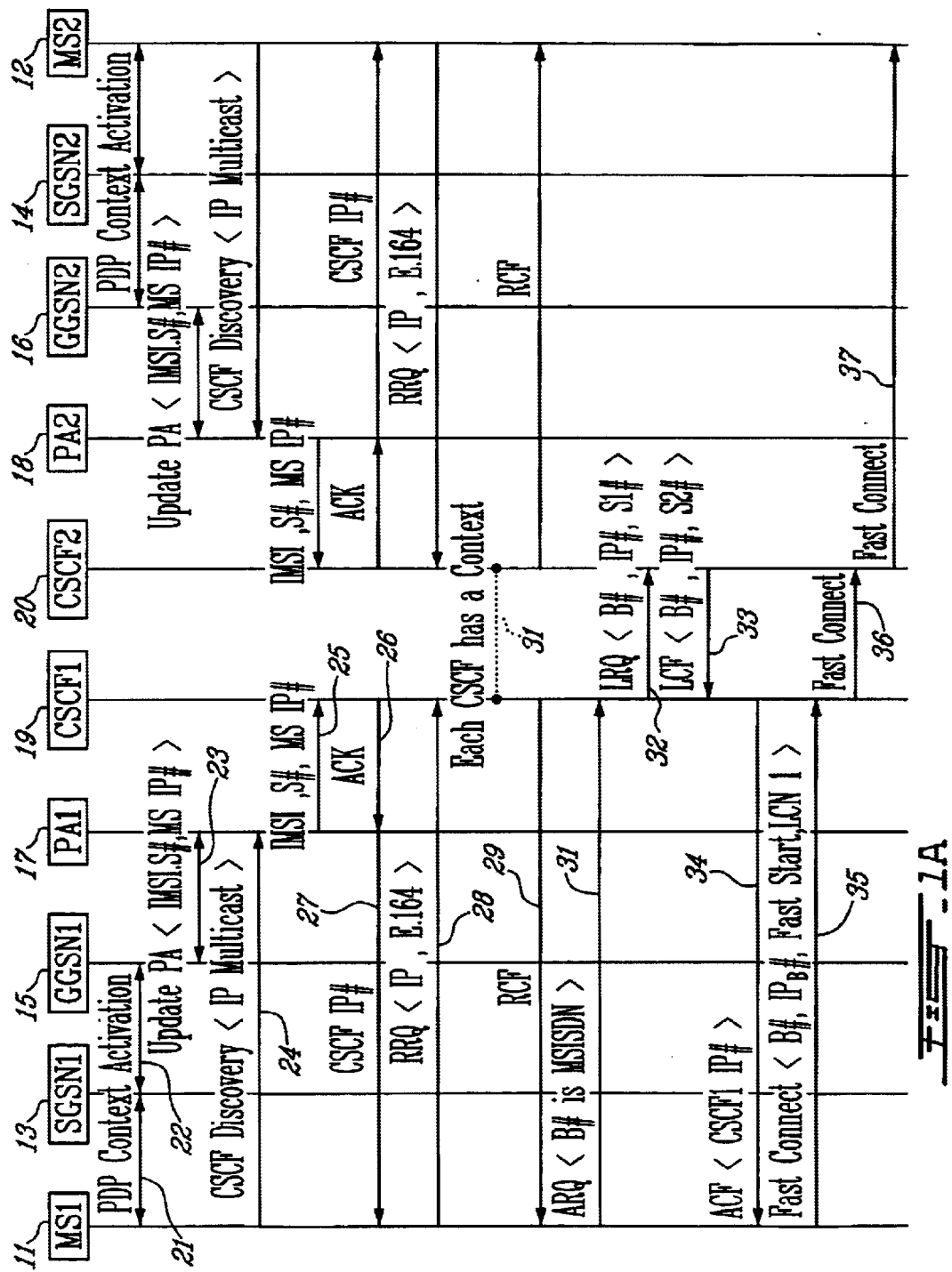

The present invention is a method of call control that optimizes a call case involving two third generation IP-based (3G.IP) mobile stations (MS1 and MS2). "Third generation" is the terminology used for launching multimedia or voice calls over packet-switched mobile access systems such as GPRS, UMTS, and CDMA2000. The call control protocol used in many of these applications is either H.323 or SIP running over the IP-based PDP context. In the case of either H.323 or SIP, the present invention modifies and utilizes the Call State Control Function (CSCF) that is part of the 3G.IP baseline network reference model. The major function performed by the CSCF is to serve as either an H.323 gatekeeper or a SIP proxy server.

It is imperative that the core network create the shortest route tunnel between the two MSs in order to minimize the overall delay in end-to-end delivery of the voice payload. The present invention sets up an optimized tunnel for the voice payload in one of two ways. The tunnel may be set up between the Serving GPRS Service Nodes (SGSNs) serving each MS. Alternatively, using UMTS procedures, an Inter-BSC interface ($I_{UR}$) and a BSC-to-SGSN interface ($I_U$) may be utilized to set up a tunnel directly between the base station controllers (BSCs) of the radio base stations (RBSs) controlling each of the MSs for further optimization and reduction in delay. A similar approach can be used in CDMA2000 to set up tunnels between two serving Packet Data Service Nodes (PDSNs).

Several issues, however, must be addressed from a call control perspective before the third generation system can start delivering voice calls with the quality and timeliness associated with circuit switched conventional second generation systems such as the Global System for Mobile Communications (GSM) or ANSI-41 Time Division Multiple Access (TDMA) systems. For example, a multicast gatekeeper discovery message is sent from the MS to a Proxy Agent (PA), and the call control method must ensure that only the operator in the Public Land Mobile Network (PLMN) services the multicast gatekeeper discovery message, thus guaranteeing call control by the PLMN operator. The Proxy Agent (PA) is utilized in the present invention to guarantee that the discovery message is only received and acted upon by the PLMN-based CSCF.

Although the present invention implements a methodology to minimize the delay in call cases between two third generation IP-based MSs running 3G Voice-Over-Internet-Protocol (VoIP) call control protocols such as H.323 or SIP, in the description herein, only H.323 is covered in detail as an illustration of the signaling involved. It should be understood that the same methodology applies to SIP-based call control as well. In the MS-to-MS call case utilizing one or two SGSNs, the conventional access design philosophy of GPRS requires the IP PDU carrying the voice payload to be pushed up to at least the GGSN before being routed back. In many instances involving MSs with different Access Point Names (APNs) and hence different GGSNs, the PDU is automatically sent to the Internet Service Providers (ISPs) involved, and then the ISPs route the call back through the public IP network.

From a delay minimization perspective, it is imperative that the nearest CSCF belonging to the GPRS operator serve as the call control server and that the actual media path through the core network take on the minimum delay path. The present invention provides safeguards to prevent voice PDUs from being diverted into the public Internet or from traversing the core network and the ISP/Public IP network in a random fashion, and to ensure that a clear path be provided for the PDU.

System operators find it desirable to separate call control functions (i.e., the control plane) from the actual data transfer functions (i.e., the user plane). The originating operator, for example, may desire to retain control of the call setup so that appropriate charging records can more easily be generated. There is a problem, however, in separating the control plane from the user plane in third generation calls. One solution is to utilize actual media port numbers to ensure that the media stream is sent over a faster path, while control signals such as Registration, Access and Status (RAS) signals and Q.931 signals follow a slower and different path. In the preferred embodiment of the present invention, the problem is solved by utilizing the logical channels used for the media stream to ensure a different path for user data. Also, when optimal tunnels are created for third generation voice calls, then integrated charging CDR's are sent to a Charging Gateway (CGW) to ensure recovery of the cost involved in the tunnel setup. Due to the reduction in call setup delay, a premium may be charged for this quality of service (QoS) improvement.

It is important that any solution to the delay problem not require any changes to the call control protocol residing in the application layer in the Terminal Entity (TE) of the mobile station. In other words, there should be a clear separation of the call control protocol in the application layer and the bit pipe that is provided by the operator for launching the call control applications. This is known as the Separation of User and Control Plane approach and is essential for the provision of real-time services under GPRS. The present invention utilizes a functional entity called a Proxy Agent (PA) to convey required Mobility Management (MM) information to the CSCF during the CSCF discovery process.

In the present invention, the multicast gatekeeper discovery message from the MS to the PA passes an MM information element to the CSCF which indicates the serving SGSN for the particular MS that is in the discovery process. Additionally, the MS's SGSN, International Mobile Station Identity (IMSI), and IP address are pre-registered during the discovery process. This enables the MS to transparently register with the PLMN CSCF during registration without the aid of a proxy agent. It also enables the CSCF to create a record that includes (1) the MS-ISDN (the called B-number or the E.164 of the MS today), (2) the IP address assigned to the MS during PDP Context Activation, and (3) the serving SGSN IP and/or SS7 point code. Thus, all CSCF records for H.323-registered clients include an IP address, the E.164, the SGSN address, and optionally the IMSI for enhanced tracking of MS activities.

For an MS using the H.323v2 or better gatekeeper-routed call format during the call connect process, a Q.931 Fast Connect message with fast start parameters containing the Real Time Protocol (RTP)/media socket for the calling party is transmitted to the serving CSCF. The called party's RTP/media sockets are similarly transmitted back to the calling party in any of the Q.931 reply messages including and up to the Connect message. For MSs utilizing H.323v1, the RTP/media sockets are only exchanged during the H.245 open logical channel message exchange (LCN). In all gatekeeper-routed call cases, the gatekeeper/CSCF is fully aware of these LCN sockets.

In the present invention, the CSCF optionally performs a B-number (called number) analysis to determine whether the B-number belongs to either the CSCF's PLMN or to another PLMN domain. This provides the basis for a more intelligent form of Location Analysis multicasts (LRQ/LCF). In some cases, if no response is heard before a timeout, the CSCF queries the Home Location Register (HLR) of the respective MS to determine its location and status. This option helps in cases where multicasting is not propagated by the PLMN operator or serving ISP.

The two CSCFs also utilize their knowledge of the media channels/sockets opened up for the voice payload, along with their knowledge of the respective SGSNs involved, to create a direct tunnel between the two SGSNs for those two pairs of media sockets. The two CSCFs also generate charging records and transport them towards a Charging Gateway (CGW). The CGW integrates both sets of charging records and ensures that proper billing occurs for the MS-to-MS call case.

FIGS. 1A–1B are a message flow diagram illustrating the flow of messages between the nodes of a packet-switched mobile access system when establishing an optimized tunnel in accordance with a first embodiment of the method of the present invention. Illustrated in FIGS. 1A–1B are a first Mobile Station (MS1) 11 and a second Mobile Station (MS2) 12, a first SGSN (SGSN1) 13 serving MS1 and a second SGSN (SGSN2) 14 serving MS2, a first GGSN (GGSN1) 15 and a second GGSN (GGSN2) 16, a first PA (PA1) 17 and a second PA (PA2) 18, and a first CSCF (CSCF1) 19 and a second CSCF (CSCF2) 20. In the detailed discussion that follows, it is assumed that MS1 and MS2 register to two different CSCFs (CSCF1 and CSCF2) via two different proxy agent entities. Where appropriate, the steps are described for access by MS1, but are also performed for MS2 by the appropriate even-numbered nodes 14–20.

During PDP Context Activation at steps 21–22, the PDP context is created in the serving GGSN1 15, and includes the associated SGSN address (S-number), mobile station IMSI, and the IP address assigned to MS1. At step 23, the GGSN1 informs PA1 of the IMSI, S-number, and IP address of MS1 during this PDP Context Activation process. This takes place in a new message called the Update PA message. During the CSCF discovery process, PA1 intercepts and redirects the discovery message 24 sent by MS1 to a selected PLMN-owned CSCF. The PA appends an information element to the redirected discovery message 25 containing the IMSI, S-number, and IP address of MS1.

The CSCF then creates a pre-register record for MS1 containing the IMSI, IP address, and the MS's location (SGSN address S-number), and returns an acknowledgment 26 to PA1. PA1 then sends the unicast IP address of CSCF1 to MS1 at 27. At step 28, the H.323 call control protocol sends a registration request (RRQ) message from MS1 directly to the CSCF's unicast address which was obtained during the discovery process, and includes MS1's MS-ISDN (E.164) and its IP address. The CSCF then checks its database to determine whether pre-registration occurred, and if so, enhances its record for MS1 to include the MS IP, E.164 (MS-ISDN) with the serving SGSN's IP address. This enables the CSCF to keep track of MS1 by location as well. The CSCF optionally informs MS1's HLR of the registration.

The same sequence of events occurs for MS2 which utilizes PA2 to discover CSCF2 and then register with CSCF2 with details of its IP address, it's SGSN number, and E.164. Each CSCF then has a PDP context as noted at step 31. A Registration Confirm (RCF) message 29 is then sent from each CSCF to its respective MS.

MS1 makes the call to MS2 by sending an Admission Request (ARQ) message 31 containing the E.164 of MS2 to CSCF1. CSCF1 optionally performs a B-number analysis to determine the PLMN operator to which the called number belongs. A Location Request (LRQ) 32 is then routed from CSCF1 to CSCF2, and may also be unicast to the HLR. The CSCF may optionally send a traditional LRQ multicast to all gatekeepers with Class-D addresses, or may multicast the LRQ to a smaller subset of gatekeepers such as a special group comprising PLMN-owned gatekeepers. Multicasting to a smaller subset is more efficient than multicasting to the original Class-D group of all gatekeepers worldwide. In any case, the LRQ includes MS1's serving SGSN address (S1-number) in the nonStandardData information element of the message.

Since MS2 is registered with CSCF2, CSCF2 responds to the LRQ with a Location Confirm (LCF) message 33 that includes the E.164 and the CSCF2 transport address. This maintains the gatekeeper-routed model of call control. The LCF includes the serving SGSN address (S2-number) in the nonStandardData field. The two CSCF's record the other MS's SGSN address in a new Call in Progress information element within the database. CFCF1 then returns an Admission Confirm (ACF) message 34 containing its transport address and other particulars to MS1.

MS1 sends a Q.931 Setup Fast Connect message 35 to CSCF1 containing a sequence of openLogicalChannel structures describing the media channels on which MS1 proposes to send and receive media to the serving CSCF (CSCF1) for H.323v2 or better. Alternatively, if MS1 only supports H.323v1, CSCF1 waits for the completion of H.245 Open Logical Channel messages to determine the sockets used by MS1 for transmission and reception of media. At 36, CSCF1 forwards the Q.931 Setup Fast Connect message to CSCF2, and at 37, CSCF2 forwards the Setup Fast Connect message to MS2. The method then moves to FIG. 1B.

At step 41, MS2 initiates an Admission Request (ARQ)/Admission Confirm (ACF) exchange with CSCF2 for H.323v2 or better. MS2 sends a fastStart message to CSCF2 in either Q.931 Alerting or Connect, selecting a media channel from the proposals sent by MS1. CSCF2 forwards this message to CSCF1 at 42 and then to MS1 at 43. Alternatively, for H.323v1, both CSCFs record the media channels utilized by the two MSs in H. 245 open logical channel messages. The calling party's gatekeeper, CFCF1, becomes the anchor for an optimized tunnel set up between the two SGSNs.

Each of the CSCFs then knows the Logical channels (LCNs) over which redirection will flow, as indicated at 44. MS2 then sends a connect message to CSCF2 at 45 which forwards the message to CSCF1 at 46 and to MS1 at 47. CSCF1 then sends a new message called the Open Inter-SGSN Tunnel message 48 to GGSN1. The information elements contained in this message include the MS's media channels for the voice payload for both MS1 and MS2 (LCN1 and LCN2), along with the SGSN1 number, SGSN2 number, IMSI, and IP address. CSCF1 looks up the Call in Progress information element to determine the SGSN2 number.

GGSN1 verifies the PDP context status based on the IMSI. If valid, GGSN1 creates a new GTP signaling message called the Create Optimal Tunnel message 49 using a message type such as a decimal value between 38 to 47, as described in GSM 09.60. The information elements contained in the Open Inter-SGSN Tunnel message are forwarded to the serving SGSN in the GTP message as private extension information elements as described in GSM 09.60. At a minimum, the information elements include the IMSIs of the two MSs, the media port numbers, and the address of SGSN2. When the new GTP message is received by SGSN1, SGSN1 verifies the existence of an MM context and a PDP context, and then creates a new GTP message called the Real Time Tunnel Build Request message 51 containing the media channel numbers, IMSIs, and PDP context. The Real Time Tunnel Build Request message is then sent to SGSN2. SGSN2 verifies that the MM context and the PDP context related to MS2 exist, and if so, sends a Real Time Tunnel Build Request Acknowledgment message 52 back to SGSN1.

A bidirectional tunnel is then created at 53 between SGSN1 and SGSN2 for the direct routing of any payload from the RTP media sockets for MS1 and MS2. The anchor SGSN1 sends a GTP Create Optimal Tunnel Acknowledgment message 54 to GGSN1 confirming that the tunnel is now created. GGSN1 then sends an Open Inter-SGSN Tunnel Acknowledgment message 55 to CSCF1 confirming the optimized tunnel. CSCF1 informs CSCF2 of the creation of the tunnel at 56 which, in turn, informs GGSN2 at 57 and SGSN2 at 58.

Charging CDR's can now be generated by both of the SGSNs or the CSCFs and sent towards a Charging Gateway (not shown). All other traffic from MS1 and MS2 is forwarded to their respective GGSNs.

During an inter-SGSN Routing Area Update, the SGSN Context transfer from the old SGSN to the new SGSN includes information elements to create a new tunnel. For example, if MS1 moves from a first SGSN such as SGSN1 to a second SGSN such as SGSN3, while MS2 remains at SGSN2, then all media port information is also transferred from SGSN1 to SGSN3, and SGSN3 becomes the anchor for creating a new tunnel with SGSN2 in order to optimize media routing. The tunnel remains active until either party sends a Disconnect Request (DRQ) message to one of the CSCFs. At that time, signals are sent to both GGSNs, SGSNs, and the Charging Gateway to stop the optimized forwarding of PDUs and charging for this special path.

FIG. 2 is a message flow diagram illustrating the flow of messages between the nodes of a packet-switched mobile access system when establishing an optimized tunnel in accordance with a second embodiment of the method of the present invention. The procedures are the same as those shown in FIGS. 1A and 1B for steps 21–49. Following the Create Optimal Tunnel message 49, SGSN1 utilizes UMTS procedures to set up a tunnel directly between the base station controller serving MS1 (BSC1) 61 and the base station controller serving MS2 (BSC2) 62. Utilizing a procedure similar to a soft handoff, the BSCs use an Inter-BSC interface ($I_{UR}$) and a BSC-to-SGSN interface ($I_U$) to establish the inter-BSC tunnel.

At step 63, SGSN1 sends an $I_U$ Create Optimal Tunnel message to BSC1. BSC1 then sends an $I_{UR}$ Real Time Tunnel Build Request message 64 to BSC2. BSC2 returns an acknowledgment at 65, and the bidirectional tunnel between the BSCs is established at 66. This provides for further optimization and reduction in call setup delay. BSC1 then sends an $I_U$ Create Optimal Tunnel Acknowledgment message 67 to SGSN1. SGSN1 sends a GTP Create Optimal Tunnel Acknowledgment message 68 to GGSN1 confirming that the tunnel is now created. GGSN1 then sends an Open Inter-SGSN Tunnel Acknowledgment message 69 to CSCF1 confirming the optimized tunnel. CSCF1 informs CSCF2 of the creation at 71 which, in turn, informs GGSN2 at 72 and SGSN2 at 73.

In this manner, the present intention enables the separation of control and user planes for all third generation call cases, thus enabling the setting up of an optimized path just for voice. The invention provides for the reduction in delay and full control over charging and call control by the PLMN operator.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. In a radio telecommunication network having a packet-switched mobile access system, a method of call control that minimizes delays in launching an Internet Protocol (IP) based voice call from a first IP-based mobile station (MS) to a second IP-based MS, said method comprising the steps of:
   preventing IP-based voice traffic from being routed to an Internet Service Provider (ISP); and
   setting up an optimized IP path for the IP-based voice traffic from the first IP-based MS to the second IP-based MS,
   wherein the optimized IP path includes an IP tunnel extending from a first packet-switched service node serving the first IP-based MS to a second packet-switched service node serving the second IP-based MS, and wherein the step of setting up the optimized IP path includes creating a shortest route tunnel between the first and the second packet-switched service nodes.

2. The method of call control of claim 1 wherein the step of setting up an optimized IP path for voice traffic includes ensuring that the call is handled only by an operator from the radio telecommunications network.

3. The method of call control of claim 1, wherein the first packet-switched service node is a first base station controller (BSC), and the second packet-switched service node is a second BSC, and the step of setting up the optimized IP voice path includes creating a shortest route tunnel between the first BSC and the second BSC.

4. The method of call control of claim 1, wherein the first packet-switched service node is a first serving General Packet Radio Service (GPRS) service node (SGSN), and the second packet-switched service node is a second SGSN, and the step of setting up the optimized IP voice path includes creating a shortest route tunnel between the first SGSN and the second SGSN.

5. The method of call control of claim 4 wherein the step of preventing voice traffic from being routed to an ISP includes the steps of:
   implementing in the radio telecommunications network, a Call State Control Function (CSCF) associated with each MS to serve as a gatekeeper;
   diverting to the CSCF, a discovery message sent from the first MS to a Gateway GPRS Service Node (GGSN);
   passing mobility management information for the first MS to its associated CSCF; and
   passing voice payload media channel information between the CSCF associated with the first MS and the CSCF associated with the second MS so that the voice payload is not routed to the GGSN.

6. The method of call control of claim 5 further comprising the steps of:
   generating sets of charging records by the first and second CSCFs;
   transporting the charging records towards a Charging Gateway (CGW);
   integrating, by the CGW, both sets of charging records to ensure proper billing for the MS-to-MS call.

7. The method of call control of claim 5 further comprising the step of performing by the CSCF, a called-number analysis to determine whether the called number belongs to the CSCF's own network or to another network.

8. The method of call control of claim 7 wherein the step of performing a called-number analysis includes sending a location query to the called MS's home location register (HLR).

9. In a Proxy Agent (PA) in a radio telecommunication network having a packet-switched mobile access system, a method of call control that minimizes delays in launching a voice call from a first Internet Protocol (IP)-based mobile station (MS) to a second IP-based MS, said method comprising the steps of:
   receiving in the PA, a context activation message, the context activation message including an identity number for the first MS, an identity number for a switch serving the first MS, and an IP address for the first MS;
   intercepting in the PA, a discovery message sent from the first MS to a Gateway GPRS Service Node (GGSN);
   modifying the discovery message by adding an information element comprising the identity number for the first MS, the identity number for a switch serving the first MS, and the IP address for the first MS;
   from the identity number for the serving switch, identifying a Public Land Mobile Network (PLMN) to which the switch belongs;
   selecting a Call State Control Function (CSCF) in the PLMN to which the switch belongs;
   sending the modified discovery message to the selected CSCF; and
   sending an IP address for the selected CSCF to the first MS so that call setup can continue between the first MS and the selected CSCF.

10. The method of call control of claim 9 further comprising, before the step of sending an IP address for the selected CSCF to the first MS, the step of receiving an acknowledgment message from the selected CSCF in response to the modified discovery message.

* * * * *